July 25, 1961  W. F. ZEWISKE  2,993,727
COMBINATION RACK FOR PICK-UP TRUCK
Filed March 30, 1960  3 Sheets-Sheet 1
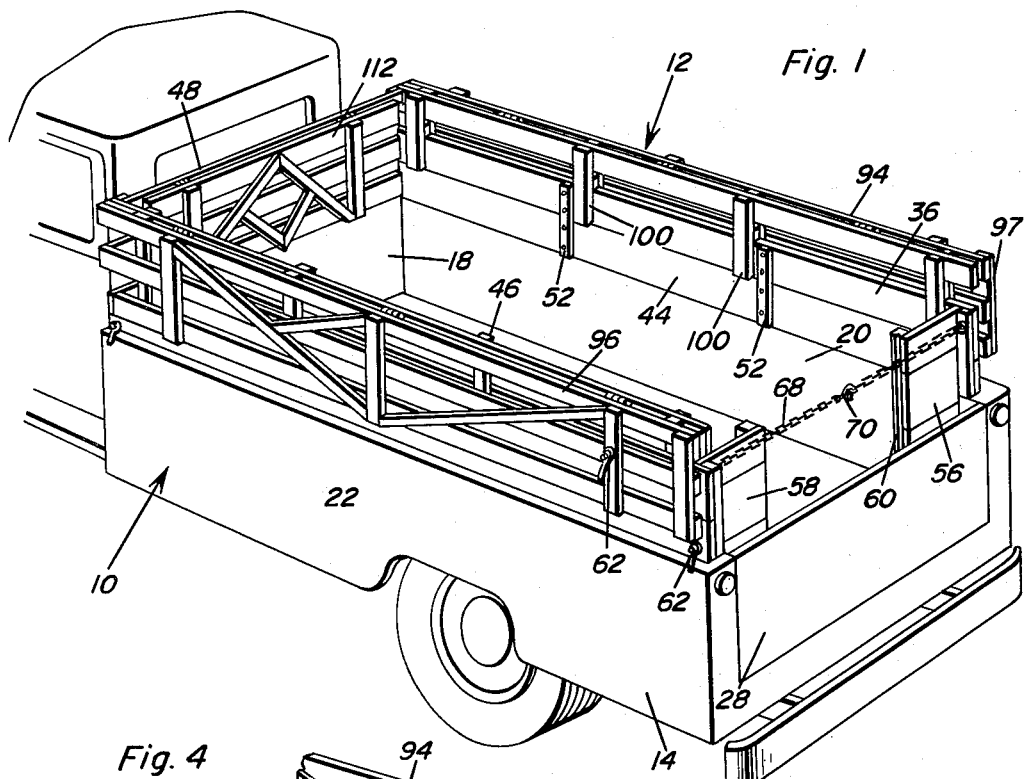
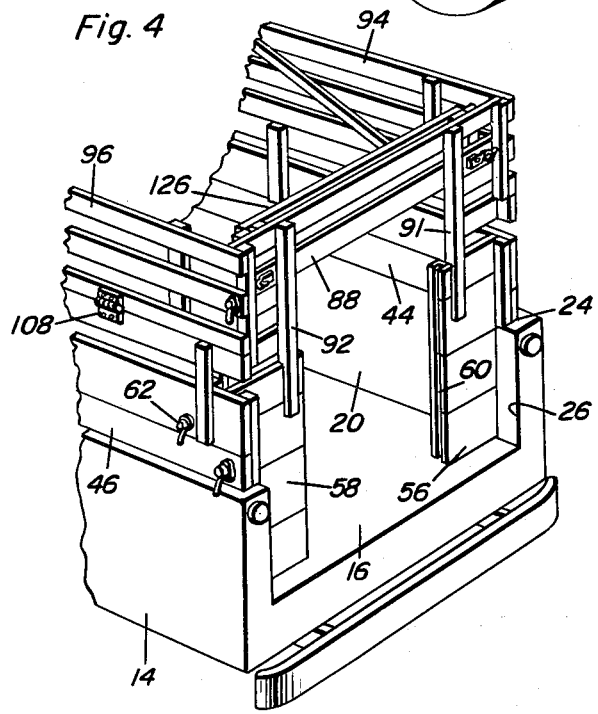
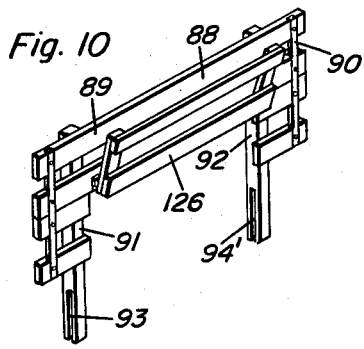
Walter F. Zewiske
INVENTOR.

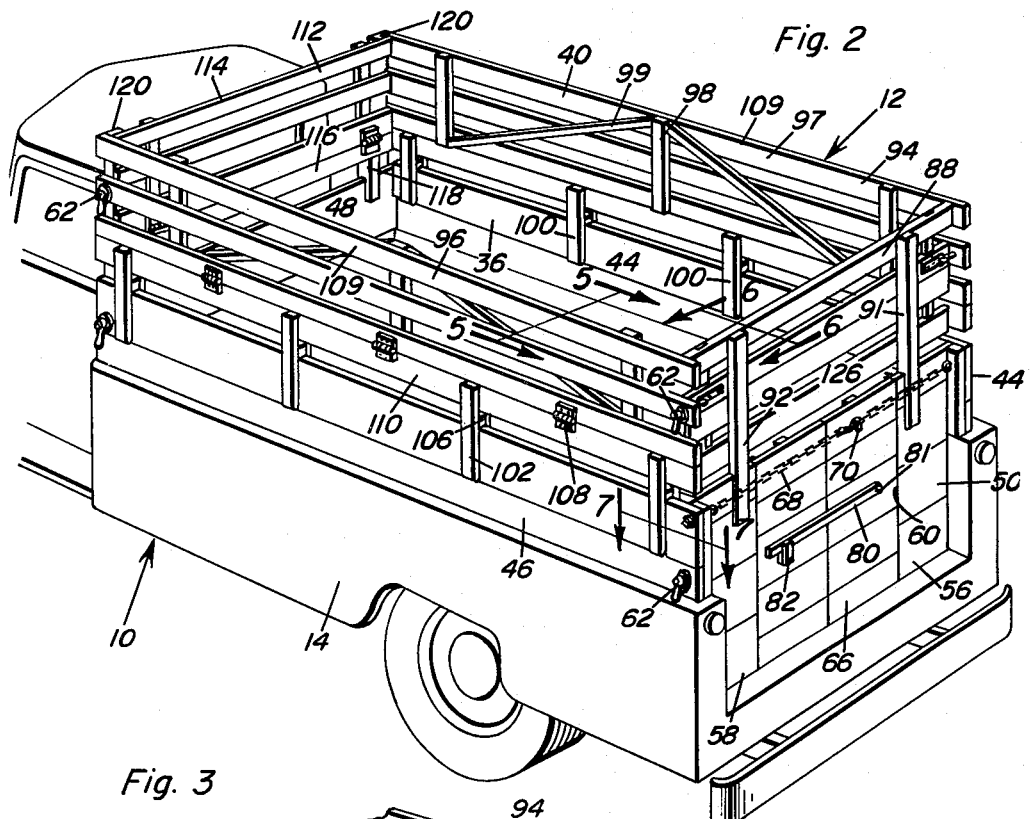
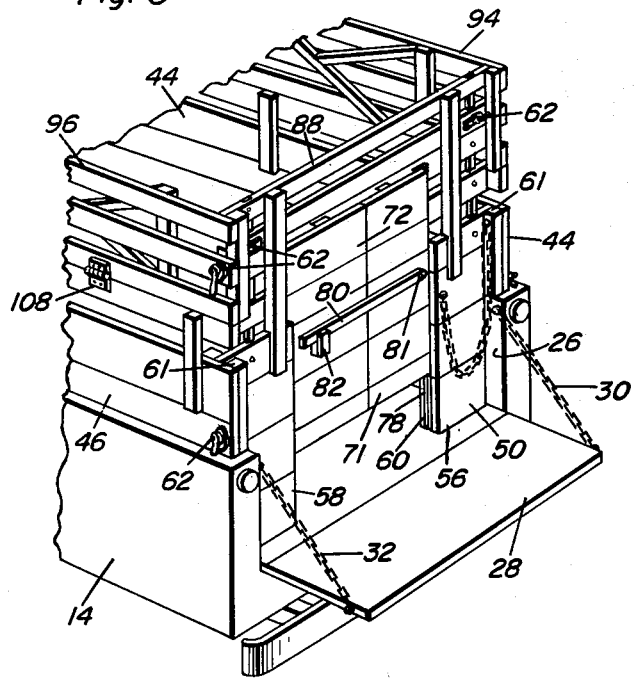
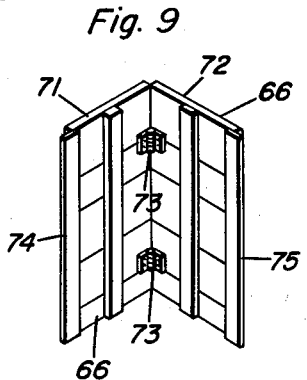

July 25, 1961  W. F. ZEWISKE  2,993,727
COMBINATION RACK FOR PICK-UP TRUCK
Filed March 30, 1960  3 Sheets-Sheet 3

Walter F. Zewiske
INVENTOR.

BY Clarence A. O'Brien
and Harvey B. Jacobson
Attorneys

United States Patent Office 2,993,727
Patented July 25, 1961

2,993,727
COMBINATION RACK FOR PICK-UP TRUCK
Walter F. Zewiske, % Endgate Guide Co., Box 716,
Fairbank, Iowa
Filed Mar. 30, 1960, Ser. No. 18,734
12 Claims. (Cl. 296—13)

This invention relates to attachments for vehicle bodies and more particularly to a combination rack and box which is particularly useful in connection with a conventional pick-up truck body.

An object of the invention is to provide a combination rack and box for a motor vehicle truck body, the combined rack and box being easy to assemble, fold and remove.

Another object of the invention is to provide a combination attachment for a truck body with an improved and unique end wall structure enabling the truck body attachment to be operated much more easily especially when converting between a grain carrier and an animal carrier. Further, loading and unloading of any material, equipment, livestock, etc. is materially facilitated by the arrangement of parts and construction of the end structure.

An important feature of the attachment is that it is designed to be used with a pick-up truck body either with or without the end gate. Some jobs are more easily performed if an end gate is used, while others call for the removal of the end gate. In both situations the attachment provides absolutely no interference with the end gate, its presence and its removal.

Another feature of the invention is found in the construction of the door in the end structure of the attachment. The door is composed of a pair of hingedly connected panels so that they may be articulated for rapid and easy removal from the guide-rail sliding connection between the edges of the door and the opposing edges of an entrance in the end structure of the attachment.

Another important feature of the invention is the locking procedure for the door in the end structure, the procedure made possible by having guides along two edges of the door and rails at opposing edges of the entrance in the end structure. The guides fit loosely in the rails so that the door may be cocked to the left or the right after it is elevated to the desired position. By cocking the door in this way it is held to the selected elevated position thereby avoiding the necessity of mechanical locks to serve this purpose.

Briefly, a typical form of the invention is embodied in a box formed of a plurality of panels attached to the walls of a pick-up body. The panels are secured to the front and two sides, respectively, of the vehicle body, and the rear panel is special in that it is provided with an entrance. The rear panel is set back sufficiently from the rear of the vehicle body to enable the tail gate to function properly without interference therewith.

The rack is composed of two rack side walls separably attached to the box panels, a front rack wall separably attached to the front box panel, and a special rear rack wall separably connected with the rear panel of the box. The two side rack walls and the front rack wall each have upper and lower sections with the upper sections hinged to the lower sections. The side upper sections of the rack walls hinge outwardly with reference to the vehicle body to enable them to swing free from any load which may be in the truck and so that they will not occupy valuable cargo space, as would be the case were they hinged inwardly. Therefore, the rack walls may be removed thereby leaving only the box on the truck. Alternatively, the upper sections of the rack walls may be hinged down thereby lowering the profile of the combined vehicle body and attachment and yet, have the rack walls connected to the box.

The end structure of the attachment is composed of the previously mentioned lower panel of the box and the rear rack wall that is separably attached to the rear panel. The previously discussed door is mounted in the entrance of the lower panel, and the upper rear rack wall is laterally positioned with respect to the up and down path of travel of the door to enable it to function properly. Further, a part of the rear rack wall has a hinged section directly or essentially directly above the entrance to effectively enlarge the size of the entrance at the option of the user.

Accordingly, a further object of the invention is to provide a generally improved attachment for a motor vehicle truck body enabling the truck body to be more versatile, with the attachment for the truck body possessing a number of desirable and advantageous features.

These together with other objects and advantages which will become subsequenly apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of a truck showing a pick-up body equipped with an attachment in accordance with the invention.

FIGURE 2 is a perspective view of the truck in FIGURE 1 but showing the attachment in a different position of adjustment.

FIGURE 3 is a fragmentary view showing the end of the attachment and a portion of the sides, this view also showing the door in an open position and the end gate; whereas, FIGURE 2 shows the same end of the same truck with the end gate removed.

FIGURE 4 is a fragmentary perspective view showing the rear part of the attachment in a different adjusted position.

FIGURE 9 is a perspective view of the door in the end structure of the attachment.

FIGURE 10 is a perspective view of the upper wall of the rear of the rack.

Figure 5:
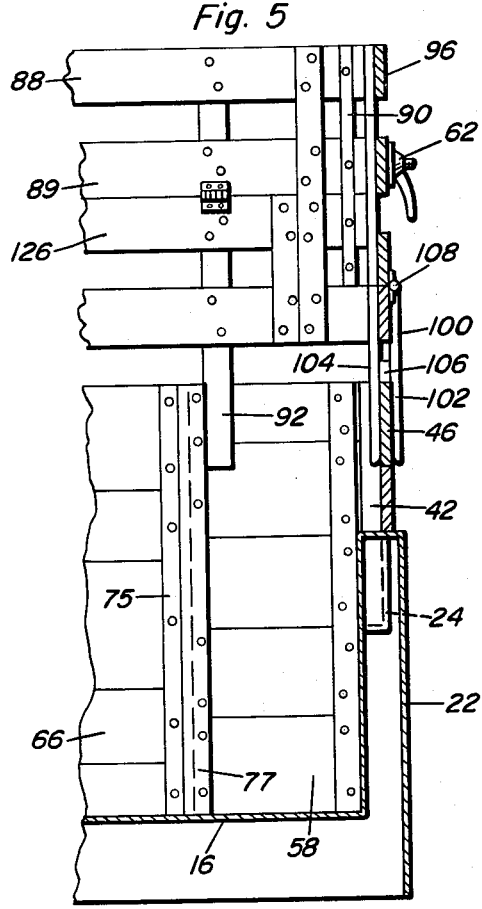
FIGURE 5 is an enlarged fragmentary sectional view taken on a vertical plane passing through line 5—5 of FIGURE 2.
Figure 6:
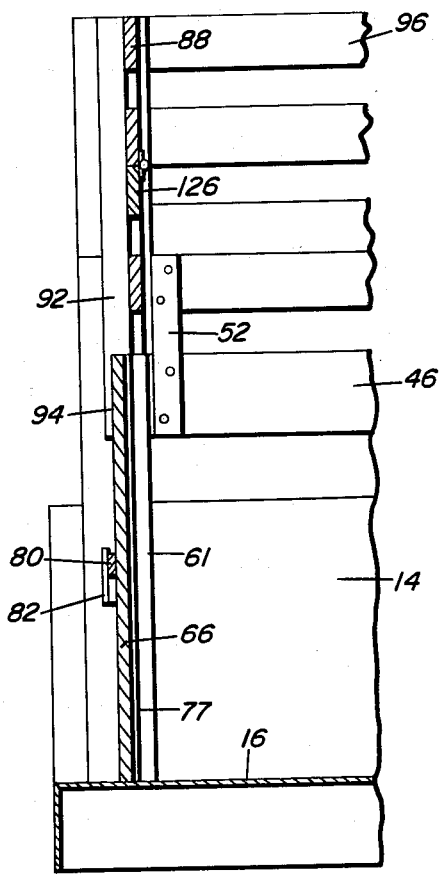
FIGURE 6 is an enlarged sectional view taken on a vertical plane passing through line 6—6 of FIGURE 2.
Figure 7:
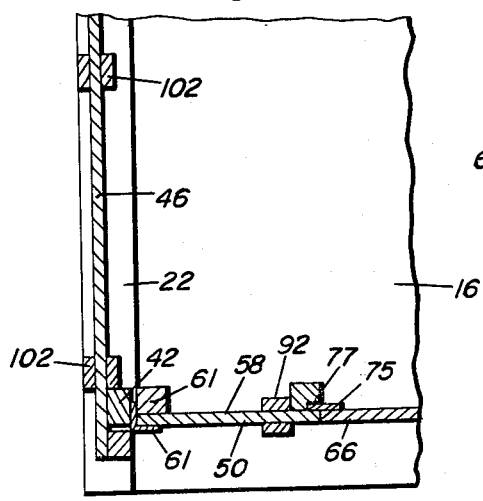
FIGURE 7 is a sectional view taken approximately on the line 7—7 of FIGURE 2 and on an enlarged scale.

In the accompanying drawings there is an illustration of a conventional pick-up truck 10 to show the suggested uses of attachment 12 which constitutes a typical embodiment of the invention. The conventional truck 10 has a vehicle body 14 with a floor 16, a front 18 and two sides 20 and 22. The sides are equipped with upwardly opening sockets 24 to receive stakes, and the rear of the vehicle body defines an opening 26 for loading and unloading the vehicle body. End gate 28 is separably attached to the vehicle body 14 and ordinarily occupies opening 26. As shown in FIGURE 3, end gate 28 has suspension chains 30 and 32 connected with it, and it is understood that the end gate 28, suspension chains 30 and 32, and means detachably securing the end gate for swinging movement in opening 26 are all conventional.

Attachment 12 is a combination box 36 and rack 40 with the rack separably attached to the box, and the box separably secured to the various walls of the vehicle body 14 by means of stakes 42 (FIGURE 5) fitting into sockets 24. Box 36 is constructed of two side panels 44 and 46, a front panel 48 and a rear panel 50. The rear panel constitutes a part of an end wall structure for the attachment, while the sides 44 and 46 fit flush on the upper parts of vehicle body walls 20 and 22, and end panel 48 fits flush against the top part of the wall 18. These three panels 44, 46 and 48 are each preferably made of boards which are attached together by upright braces 52 (FIGURE 1) attached to the inner surfaces thereof or mitered into the surfaces. The braces may be riveted in place or held by other conventional fasteners firmly to the boards of the panels. It is evident that solid plyboard panels or metal panels may be used, however, it has been found that a good grade of planks or boards are very serviceable.

End panel 50 is made of two parts 56 and 58 that are spaced apart to define an entrance 60 therebetween. Here again, panel 50 is preferably made of boards held together by vertical braces. The outer edges of the two parts 56 and 58 of box panel 50 are located between pairs of strips 61 which are secured to the inner surfaces of the rear parts of panels 44 and 46, and hold-down clamps may be used to supplement the holding action between the panel 50 and panels 44 and 46. A typical clamp 62 is shown in FIGPRE 8 and consists of a threaded eye bolt 63 attached to a bracket 64 at the eye thereof and provided with a handled nut 65. In those cases where floor 16 of the vehicle body 14 is corrugated, the lower edges of panel 50 may be similarly ocntoured, and the same holds true for the door 66 (FIGURE 9) which fits between opposing edges of entrance 60. Additional bracing between panels 44 and 46 is obtained by two lengths of chain 68 connected together by an hook and eye 70 and attached at the outer ends to panels 44 and 46 (FIGURE 2).

Door 66 constitutes an important part of box 36 and is made of two sections or panels 71 and 72 connected together by hinges 73 at confronting edges. The panel may be of solid construction or of plank construction as shown in FIGURE 9 insofar as the separate panels 71 and 72 are concerned. Outer edges of panels 71 and 72 are equipped with guides 74 and 75 which slide up and down in inwardly opening essentially U-shaped tracks 77 and 78 formed along the confronting opposing edges of entrance 60. Guides 74 and 75 fit loosely in the tracks 77 and 78 so that the door 66 may be elevated to a selected height and cocked either to the left or the right so that it binds in the tracks and locks itself in a selected elevated position. This avoids the necessity of mechanical locks to serve this purpose and also enables the user to select an infinite number of different heights between limits of the upper reach and lower end of the tracks. Further, since the door 66 is made of hingedly connected panels, the door may be easily removed due to the looseness between guides 74, 75 and tracks 77, 78 and the folding of the door along the hinge axis thereof (FIGURE 9). To hold the door with its panels coplanar a large bar 80 is connected by a hinge pin 81 to panel 71, and an upwardly opening keeper bracket 82 is attached to the other panel 72 to receive the latch bar 80, requiring it to span the hinge connection between panels 71 and 72 when the latch bar is in the locking position.

Figure 8:
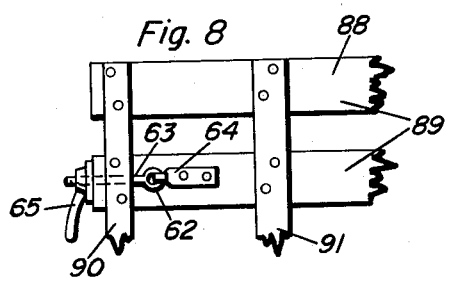
FIGURE 8 is a fragmentary elevational view showing a detail of construction, i.e., one of a number of identical locks used in the attachment.

Rack 40 has an upper rear rack wall 88 (FIGURE 10) which constitutes a portion of the previously mentioned end structure for the attachment. Rack wall 88 is composed of a plurality of boards 89 joined together by means of braces 90 and also by means of slotted stakes 91 and 92. A design variation would be to have the boards 89 substituted by a solid panel, but in either case the stakes 91 and 92 having downwardly opening slots 93 and 94' therein would be used. The slotted stakes fit over the upper edges of parts 56 and 58 of panel 50 thereby partially supporting the rack wall 88 as an upward extension of the panel 50. However, the plane of boards 89 is set back from the essentially vertical plane of tracks 77 and 78 to allow the door 66 to move to an elevated position as shown in FIGURE 3 without interference. Further, the entire end structure as shown in FIGURE 3 is set in from opening 26 to allow the usual movements and operation of the end gate 28 to be performed. Hold-down clamps 62 are at opposite sides of the wall 88 and they engage rack walls 94 and 96 by having the bolts 63 thereof pass through apertures in the rack walls 94 and 96. Nuts 95 are preferably backed by a washer (FIGURE 8).

Rack walls 94 and 96 are identical except one is for the left side of the attachment and the other is for the right side of the attachment. Each side rack wall 94 and 96 is made of spaced planks 97 with transverse braces 98 rigidly secured thereto and a number of diagonal braces 99 also secured thereto. Small spacer blocks may be used between planks if it is found desirable or necessary, and there are cleats 100 which separably attach the side rack walls 94 and 96 to the walls 44 and 46 of the box. The cleats 100 (FIGURE 5) may be constructed simply of a pair of metal straps 102 and 104 attached by fasteners to the lower plank or planks of sides 94 and 96, or straps 102 and 104 may be made of wood. In either case they are spaced apart a sufficient distance to straddle the upper portions of walls 44 and 46, and small gauge blocks 106 are within the straddle cleats to vertically space the walls 94 and 96 from the sides 44 and 46 of the box.

Each side 94 and 96 is made of an upper section and a lower section connected together by means of hinges 108. Typical upper section 109 is capable of swinging outwardly of the vehicle body with reference to its lower section 110 as opposed to an inward swinging movement so that valuable cargo space within the vehicle body is not required for this swinging adjustment. The straddle cleats are attached to the lower sections of sides 94 and 96, while the upper sections of each rack side 94 and 96 are hingedly adjustable between the positions shown in FIGURES 1 and 2 respectively.

The front rack wall 112 is also made of an upper section 114 and a lower section 116, and is of wood construction. Slotted stakes 118 are satisfactory for attaching the lower section 116 to wall 48 and slotted stakes 118 are essentially identical to slotted stakes 91 and 92 (FIGURE 10). Upper section 114 must swing inwardly of the vehicle body since the cab of the motor vehicle would impede movement of the upper section in the opposite direction. Abutments formed by corner posts 120 attach to sides 94 and 96 limit the hinged movement of upper section 114 in one direction. The upper section is held in the elevated position by means of hold-down clamps 62 engaged between upper section 114 and the sides 94 and 96.

It is sometimes very desirable to have a high opening for entrance 60, for instance, when loading and unloading cattle, pigs, etc. Therefore, rack wall 88 has a hinged portion 126 attached to one of the boards thereof and capable of swinging to an elevated position inwardly of the vehicle body as shown in FIGURE 4. Any suitable means may be used for holding the hinged portion 126 in an elevated position since this is only a temporary condition of operation.

Numerous different types of loads may be carried by the truck equipped with attachment 12 and the various different loads will suggest different uses of the attachment and different adjustments thereof, some of which are shown in the drawings. When the rack is in the down position, the rack wall 88 can be removed as shown in FIGURE 1, and the other walls of the rack swung to the down position. The rack side walls 94 and 96 are preferably held flush against the outside surface of the box sides or side walls 44 and 46 by the use of clamps 62 which in this case are simply bolts with nuts thereon as shown in FIGURES 1 and 4.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An attachment for a truck body, said attachment comprising a plurality of panels, means vertically securing said panels to said body to form an enclosure, a plurality of rack walls, means separably securing said rack walls to the upper portions of said panels, said walls having upper and lower sections, means hingedly connecting said sections together, an end structure at the end of said body and including a lower panel provided with an entrance, an upper rack wall detachably secured to the upper part of said lower panel and having a movable section immediately above said entrance, a door in said entrance, loosely engaged guides and tracks connecting the edges of said door with opposite edges of said entrance and mounting said door for up and down movement with said door guides being capable of being cocked in said tracks to lock said door in a selected position.

2. The attachment of claim 1 wherein there are means connected to said upper rack wall and the upper sections of two of said first-mentioned rack walls to mutually brace the same.

3. The attachment of claim 1 wherein said means separably securing said rack wall lower sections to said panels include a plurality of straddle cleats which fit over portions of said panels.

4. In a motor vehicle body which has sides and an end gate opening, an attachment comprising a box which includes panels, means securing said panels to said sides, a rear panel having an entrance opening and disposed forwardly of the end gate opening in the body and in registry therewith, a rack including a pair of side rack walls, means for securing said rack walls for hinged movement to said side panels of said box, said rack side walls being swingable outwardly of the body to a lowered position, a rear rack wall bridging the rear panel entrance opening, means for securing said rear rack wall to said rear panel as an upward extension thereof.

5. In a motor vehicle body which has sides and an end gate opening, an attachment comprising a box which includes panels, means securing said panels to said sides, a rear panel having an entrance opening and disposed adjacent to the end gate opening in the body, a rack including a pair of side rack walls, means for securing said rack walls for hinged movement to said side panels of said box, said rack side walls being swingable outwardly of the body to a lowered position, a rear rack wall, means for securing said rear rack wall to said rear panel as an upward extension thereof, a door in said entrance, means movably mounting said door for up and down movement, said rear rack wall having at least a part offset from the up and down path of movement of said door to enable said door to be elevated to a position alongside of said rear rack wall.

6. In a motor vehicle body which has sides and an end gate opening, an attachment comprising a box which includes panels, means securing said panels to said sides, a rear panel having an entrance opening and disposed adjacent to the end gate opening in the body, a rack including a pair of side rack walls, means for securing said rack walls for hinged movement to said side panels of said box, said rack side walls being swingable outwardly of the body to a lowered position, a rear rack wall, means for securing said rear rack wall to said rear panel as an upward extension thereof, a door in said entrance, means movably mounting said door for up and down movement, said rear rack wall having at least a part offset from the up and down path of movement of said door to enable said door to be elevated to a position alongside of said rear rack wall, said door composed of a pair of sections hingedly connected together and establishing a hinge line between sections, the sections of said door being movable along said hinge line to separate said door from said means mounting said door in said entrance.

7. In the attachment of claim 6 wherein there are means connected to said door sections for holding said door sections coplanar and engaged in said entrance.

8. The attachment of claim 6 wherein said means mounting said door in said entrance for up and down movement include loosely engaged guides and tracks between the edges of said door and two opposing edges of said entrance, and said door being shiftable to a tilted position due to the looseness in the engagement of said tracks and guides so that said door binds and is held in a selected elevated position by the binding action.

9. An attachment for a pick-up truck body of the type comprising a rear end having an end gate opening therein, said attachment comprising a box including a rear end panel having therein an entrance opening in registry with the end gate opening, a rack mounted on the box and including a rear end panel monuted on said box panel and bridging the entrance opening, said rack panel having a passage in its lower portion communicating with the entrance opening and constituting a vertical extension thereof, means for closing the entrance opening, and means for closing the passage.

10. An attachment for a pick-up truck body of the type comprising a rear end having an end gate opening therein, said attachment comprising a box including a rear end panel having therein an entrance opening in registry with the end gate opening, a rack mounted on the box and including a rear end panel mounted on said box panel and bridging the entrance opening, said rack panel having a passage in its lower portion communicating with the entrance opening and constituting a vertical extension thereof, means for closing the entrance opening, and means for closing the passage, the last-named means including a gate hingedly suspended on the rack panel and swingable by gravity to a closed position in the passage.

11. An attachment for a pick-up truck body of the type comprising a rear end having an end gate opening therein, said attachment comprising a box including a rear end panel having therein an entrance opening in registry with the end gate opening, a rack mounted on the box and including a rear end panel mounted on said box panel and bridging the entrance opening, said rack panel having a passage in its lower portion communicating with the entrance opening and constituting a vertical extension thereof, means for closing the entrance opening, and means for closing the passage, said box panel including a pair of transversely spaced, vertical sections comprising opposed inner edges having vertical channels therein, the first-named means including a foldable door comprising hingedly connected sections slidably engaged in the channels.

12. An attachment for a pick-up truck body of the type comprising a rear end having an end gate opening therein, said attachment comprising a box including a rear end panel having therein an entrance opening in registry with the end gate opening, a rack mounted on the box and including a rear end panel mounted on said box panel and bridging the entrance opening, said rack panel having a passage in its lower portion communicating with the entrance opening and constituting a vertical extension thereof, means for closing the entrance opening, and means for closing the passage, the last-named means includnig a gate hingedly suspended on the rack panel and swingable by gravity to a closed position in the passage, said box panel including a pair of transversely spaced, vertical sections comprising opposed inner edges having vertical channels therein, the first-named means including a foldable door comprising hingedly connected sections slidably engaged in the channels.

References Cited in the file of this patent

UNITED STATES PATENTS

| | | |
|---|---|---|
| 1,351,475 | Hempy | Aug. 31, 1920 |
| 1,360,889 | Cobb | Nov. 30, 1920 |
| 1,533,475 | Smoak | Apr. 14, 1925 |
| 2,856,225 | Selzer | Oct. 14, 1958 |